(12) United States Patent
Naffziger et al.

(10) Patent No.: US 8,756,442 B2
(45) Date of Patent: Jun. 17, 2014

(54) SYSTEM FOR PROCESSOR POWER LIMIT MANAGEMENT

(75) Inventors: Samuel D. Naffziger, Fort Collins, CO (US); John P. Petry, San Diego, CA (US); Kiran Bondalapati, Los Altos, CA (US); William A. Hughes, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 344 days.

(21) Appl. No.: 12/970,172

(22) Filed: Dec. 16, 2010

(65) Prior Publication Data

US 2012/0159198 A1    Jun. 21, 2012

(51) Int. Cl.
    *G06F 1/00* (2006.01)
(52) U.S. Cl.
    USPC ........... 713/300; 713/310; 713/320; 713/322; 713/323
(58) Field of Classification Search
    CPC ......... G06F 1/3202; G06F 1/26; G06F 1/266; G06F 1/206; H04L 12/10
    USPC .......................... 713/300, 310, 320, 322, 323
    See application file for complete search history.

(56) References Cited

U.S. PATENT DOCUMENTS

| | | |
|---|---|---|
| 4,698,748 A | 10/1987 | Juzswik et al. |
| 4,747,041 A | 5/1988 | Engel et al. |
| 4,952,817 A | 8/1990 | Bolan et al. |
| 5,086,501 A | 2/1992 | DeLuca et al. |
| 5,142,684 A | 8/1992 | Perry et al. |
| 5,167,024 A | 11/1992 | Smith et al. |
| 5,300,831 A | 4/1994 | Pham et al. |
| 5,307,003 A | 4/1994 | Fairbanks et al. |
| 5,396,635 A | 3/1995 | Fung |
| 5,423,045 A | 6/1995 | Kannan et al. |
| 5,504,909 A | 4/1996 | Webster et al. |
| 5,511,205 A | 4/1996 | Kannan et al. |
| 5,546,591 A | 8/1996 | Wurzburg et al. |
| 5,557,551 A | 9/1996 | Craft |
| 5,710,929 A | 1/1998 | Fung |

(Continued)

FOREIGN PATENT DOCUMENTS

EP    0632360 A1    1/1995

OTHER PUBLICATIONS

File History for U.S. Appl. No. 60/468,742, filed May 7, 2003.
File History for U.S. Patent No. 5,778,237, issued Jul. 7, 1998.

(Continued)

*Primary Examiner* — Kim Huynh
*Assistant Examiner* — Zahid Choudhury
(74) *Attorney, Agent, or Firm* — Volpe and Koenig, P.C.

(57) ABSTRACT

A processor power limiter and method is provided. The processor includes a first programmable location configured to store a processor power target. A power monitor is configured to estimate a power dissipation due to processor load. A power controller is configured to adjust a processor power parameter based on the power target and the power dissipation. The processor may include an interface for an operating system. A second programmable location may be configured to store a software processor power target accessible by the operating system. The processor may also include a sideband interface for an external agent. A third programmable location may be configured to store an agent processor power target accessible by the external agent. The power controller may be configured to adjust a processor core voltage and/or frequency such that the power dissipation stays below the processor power target, software processor power target and the agent processor power target.

15 Claims, 5 Drawing Sheets

(56) References Cited

U.S. PATENT DOCUMENTS

| | | | |
|---|---|---|---|
| 5,719,800 | A | 2/1998 | Mittal et al. |
| 5,727,193 | A | 3/1998 | Takeuchi |
| 5,745,375 | A | 4/1998 | Reinhardt et al. |
| 5,752,011 | A | 5/1998 | Thomas et al. |
| 5,758,175 | A | 5/1998 | Fung |
| 5,778,237 | A | 7/1998 | Yamamoto et al. |
| 5,781,783 | A | 7/1998 | Gunther et al. |
| 5,787,294 | A | 7/1998 | Evoy |
| 5,798,918 | A | 8/1998 | Georgiou et al. |
| 5,799,198 | A | 8/1998 | Fung |
| 5,812,860 | A | 9/1998 | Horden et al. |
| 5,832,284 | A | 11/1998 | Michail et al. |
| 5,838,578 | A | 11/1998 | Pippin |
| 5,860,125 | A | 1/1999 | Reents |
| 5,892,959 | A | 4/1999 | Fung |
| 5,898,232 | A | 4/1999 | Reents et al. |
| 5,940,785 | A | 8/1999 | Georgiou et al. |
| 6,047,248 | A | 4/2000 | Georgiou et al. |
| 6,079,025 | A | 6/2000 | Fung |
| 6,119,241 | A | 9/2000 | Michail et al. |
| 6,141,762 | A | 10/2000 | Nicol et al. |
| 6,311,287 | B1 | 10/2001 | Dischler et al. |
| 6,378,074 | B1 | 4/2002 | Tiong |
| 6,393,374 | B1 | 5/2002 | Rankin et al. |
| 6,564,328 | B1 | 5/2003 | Grochowski et al. |
| 6,584,571 | B1 | 6/2003 | Fung |
| 6,667,648 | B2 | 12/2003 | Stout et al. |
| 6,785,826 | B1 | 8/2004 | Durham et al. |
| 6,789,037 | B2 | 9/2004 | Gunther et al. |
| 6,792,582 | B1 | 9/2004 | Cohn et al. |
| 6,859,882 | B2 | 2/2005 | Fung |
| 6,908,227 | B2 | 6/2005 | Rusu et al. |
| 6,931,559 | B2 | 8/2005 | Burns et al. |
| 6,976,182 | B1 | 12/2005 | Filippo |
| 6,978,389 | B2 | 12/2005 | Jahnke |
| 6,993,669 | B2 | 1/2006 | Sherburne, Jr. |
| 7,032,119 | B2 | 4/2006 | Fung |
| 7,051,306 | B2 | 5/2006 | Hoberman et al. |
| 7,058,826 | B2 | 6/2006 | Fung |
| 7,068,319 | B2 | 6/2006 | Barna et al. |
| 7,100,061 | B2 | 8/2006 | Halepete et al. |
| 7,134,011 | B2 | 11/2006 | Fung |
| 7,216,064 | B1 | 5/2007 | Pippin |
| 7,228,441 | B2 | 6/2007 | Fung |
| 7,237,129 | B2 | 6/2007 | Fung |
| 7,254,721 | B1 | 8/2007 | Tobias et al. |
| 7,272,735 | B2 | 9/2007 | Fung |
| 7,281,140 | B2 | 10/2007 | Burns et al. |
| 7,337,339 | B1* | 2/2008 | Choquette et al. ............ 713/320 |
| 7,376,848 | B2 | 5/2008 | Beard |
| 7,415,680 | B2 | 8/2008 | Hoberman et al. |
| 7,484,111 | B2 | 1/2009 | Fung |
| 7,512,822 | B2 | 3/2009 | Fung |
| 7,533,283 | B2 | 5/2009 | Fung |
| 7,552,350 | B2 | 6/2009 | Fung |
| 7,558,976 | B2 | 7/2009 | Fung |
| 7,562,239 | B2 | 7/2009 | Fung |
| 7,647,513 | B2 | 1/2010 | Tobias et al. |
| 7,721,125 | B2 | 5/2010 | Fung |
| 7,822,967 | B2 | 10/2010 | Fung |
| 7,945,885 | B2 | 5/2011 | Hoberman et al. |
| 7,996,811 | B2 | 8/2011 | Hoberman et al. |
| 8,060,765 | B1* | 11/2011 | Cha et al. ...................... 713/322 |
| 8,074,092 | B2 | 12/2011 | Fung |
| 2002/0004912 | A1 | 1/2002 | Fung |
| 2002/0004913 | A1 | 1/2002 | Fung |
| 2002/0004915 | A1 | 1/2002 | Fung |
| 2002/0007463 | A1 | 1/2002 | Fung |
| 2002/0007464 | A1 | 1/2002 | Fung |
| 2002/0062454 | A1 | 5/2002 | Fung |
| 2003/0188208 | A1 | 10/2003 | Fung |
| 2003/0196126 | A1 | 10/2003 | Fung |
| 2005/0223251 | A1* | 10/2005 | Liepe et al. .................... 713/322 |
| 2007/0050647 | A1* | 3/2007 | Conroy et al. ................. 713/300 |
| 2007/0198863 | A1* | 8/2007 | Bose et al. ..................... 713/300 |
| 2008/0098242 | A1* | 4/2008 | Peterson ........................ 713/320 |
| 2008/0301475 | A1* | 12/2008 | Felter et al. ................... 713/300 |
| 2009/0077399 | A1* | 3/2009 | Noda et al. .................... 713/320 |
| 2009/0259869 | A1 | 10/2009 | Naffziger |
| 2009/0276644 | A1* | 11/2009 | Goodnow et al. ............. 713/310 |
| 2010/0268974 | A1* | 10/2010 | Floyd et al. ................... 713/340 |
| 2012/0137158 | A1* | 5/2012 | Nelluri et al. ................. 713/340 |

OTHER PUBLICATIONS

File History for U.S. Patent No. 7,051,306, issued May 23, 2006.

File History for U.S. Patent No. 7,415,680, issued Aug. 19, 2008.

File History for U.S. Patent No. 7,945,885, issued May 17, 2011.

Memorandum Opinion and Order Construing Claim Terms of United States Patent Nos. 5,577,230; 5,724,505; 5,958,036; 6,141,762; 6,256,725; 7,051,306; 7,415,680; 7,945,885; and 7,996,811; Civil Action No. 6:11-cv-00173, Document 252, Filed Apr. 29, 2013; *Mosaid Techs, Inc. et al. v. Freescale Semiconductor, Inc. et al.*; United States District Court for the Eastern District of Texas—Tyler Division, pp. 1-49.

AMD PowerNow!™ Technology, Dynamically Manages Power and Performance (Informational White Paper); Publication #24404 Rev: A; Issue Date: Nov. 2000, 18 pages.

Thomas D. Burd, et al. "A Dynamic Voltage Scaled Microprocessor System"; IEEE Journal of Solid-State Circuits, vol. 35, No. 11, Nov. 2000, pp. 1571-1580.

Thomas D. Burd, et al. "WA 17.4 A Dynamic Voltage Scaled Microprocessor System"; 2000 IEEE International Solid-State Circuits Conference (07803-5843-8/00), Feb. 7-9, 2000, 3 pages.

Kevin J. Nowka, et al. "A 32-bit PowerPC System-on-a-Chip With Support for Dynamic Voltage Scaling and Dynamic Frequency Scaling"; IEEE Journal of Solid-State Circuits, vol. 37, No. 11, Nov. 2002, pp. 1441-1447.

Luca Benini, et al. "A Survey of Design Techniques for System-Level Dynamic Power Management"; IEEE Transactions on Very Large Scale Integration (VLSI) Systems, vol. 8, No. 3, Jun. 2000, pp. 299-316.

David E. Lackey, et al. "Managing Power and Performance for System-on-Chip Designs using Voltage Islands"; IBM Microelectronics Division, Essex Junction, Vermont 05452, USA (0-7803-7607-2/02); © 2002 IEEE, Nov. 10-14, 2002, pp. 195-202.

Anoop Iyer, et al. "Power Efficiency of Voltage Scaling in Multiple Clock, Multiple Voltage Cores"; Department of Electrical and Computer Engineering, Carnegie Mellon University, Pittsburgh, PA 15213 (0-7803-7607-2/02); © 2002 IEEE, Nov. 10-14, 2002, pp. 379-386.

Hector Sanchez, et al. "Thermal Management System for High Performance PowerPC™ Microprocessors"; Motorola, Inc./Apple Computer Corporation, (1063-6390/97); © 1997 IEEE, Feb. 23-26, 1997, pp. 325-330.

Emil Talpes, et al. "Toward a Multiple Clock/Voltage Island Design Style for Power-Aware Processors"; IEEE Transactions on Very Large Scale Integration (VLSI) Systems, vol. 13, No. 5, May 2005, pp. 591-603.

\* cited by examiner

SYSTEM FOR PROCESSOR POWER LIMIT MANAGEMENT

FIELD OF INVENTION

This invention relates to processor power control apparatus and methods.

BACKGROUND

The Advanced Configuration and Power Interface (ACPI) specification provides a standard for operating system-centric device configuration and power management. The ACPI specification defines various "states" as levels of power usage and/or features availability. ACPI states include: global states, e.g., G0-G3, device states, e.g., D0-D3, processor states, e.g., C0-C3, and performance states, e.g., P0-Pn. The operating system and/or a user may select a desired processor state and a desired performance state in an effort to save power. However, of ACPI P-States are not sufficient to allow host software or software on an external agent to achieve optimal performance given a particular power target.

SUMMARY OF EMBODIMENTS

A processor power limiter and method is provided. The processor includes a first programmable location configured to store a processor power target. A power monitor is configured to estimate a power dissipation due to processor load. A power controller is configured to adjust a processor power parameter based on the power target and the power dissipation. The processor may include an interface for an operating system. A second programmable location may be configured to store a software processor power target accessible by the operating system. The processor may also include a sideband interface for an external agent. A third programmable location may be configured to store an agent processor power target accessible by the external agent.

The processor power target may be set to the lowest value stored in the first and second programmable locations. The processor power target may also be set to the lowest value stored in the first, second and third programmable locations. The processor may be configured to estimate a power dissipation associated with multiple processor cores. The power controller may be configured to adjust a processor power parameter associated with multiple processor cores. The power controller may be configured to adjust a processor core voltage such that the power dissipation stays below the power target. The processor may also be configured to adjust a processor core frequency such that the power dissipation stays below the power target. The processor may be configured to estimate the power dissipation during a time window.

DETAILED DESCRIPTION OF THE EMBODIMENTS

Figure 1:
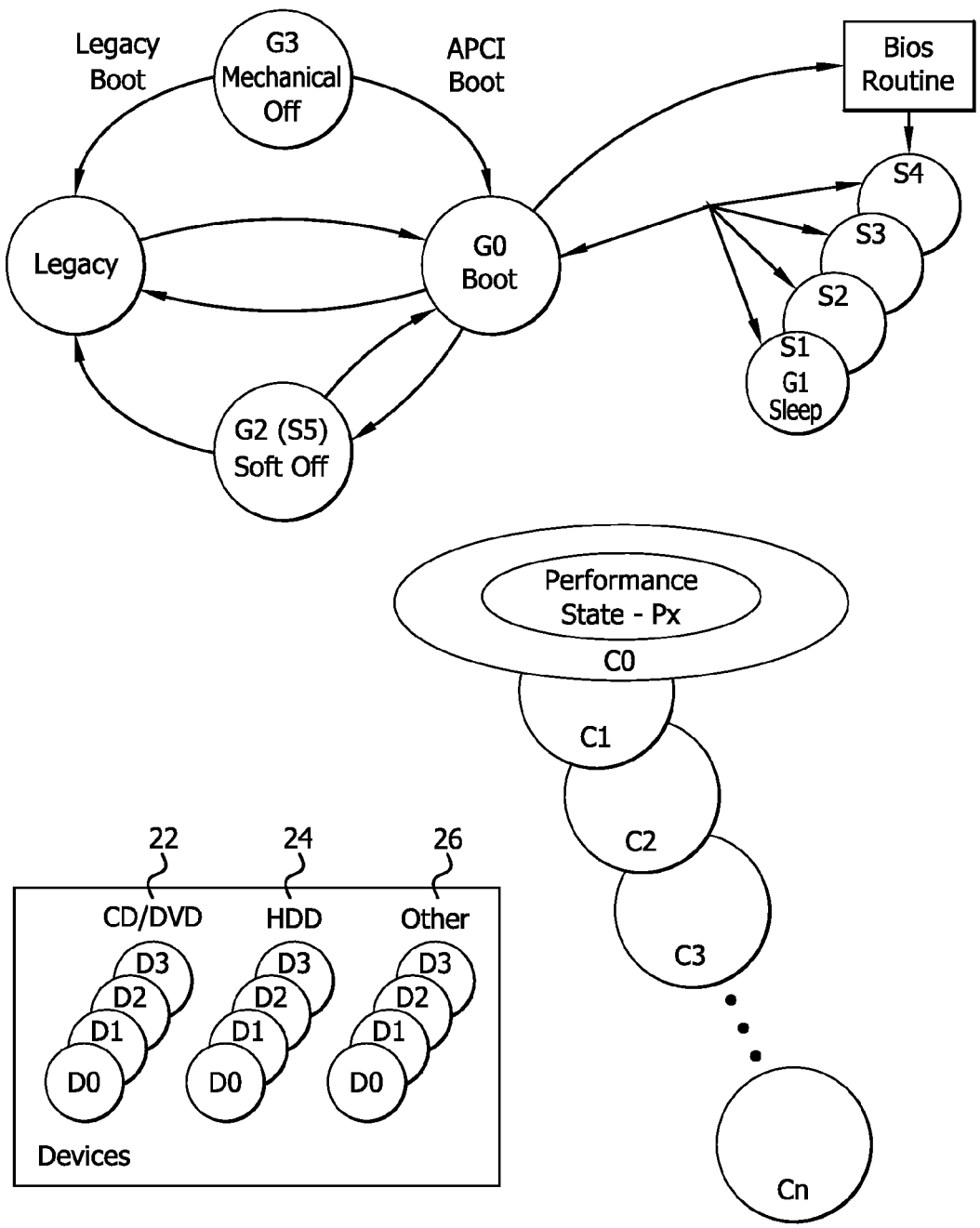
FIG. 1 is a block diagram showing a variety of Advanced Configuration and Power Interface (ACPI) states.

FIG. 1 is a bock diagram illustrating a variety of Advanced Configuration and Power Interface (ACPI) states. It should be understood that the techniques disclosed herein may also be applied to other power state standards or configurations. The ACPI specification defines various "states" as levels of power usage and/or features availability. ACPI states include: global states, e.g., G0-G3, device states, e.g., D0-D3, processor states, e.g., C0-C3, and performance states, e.g., P0-Pn. Some global states may be further divided into a plurality of substates, e.g., G1 is divided into S1-S4 sleep states. Device states may be associated with a plurality of devices such as devices CD/DVD drives 22, hard disk drives 24 and other devices 26. When operating, a system will be in the G0(S0) state with a C0 processor state.

While operating, a given processor core may also be associated with one of several performance states or "P-States" (P0-Pn). P0 is typically the highest-performance state. P1-Pn are successively lower-performance states. Typically n is no greater than 16. Each P-state is associated with a processor core operating frequency and core voltage, e.g., $V_{core}$. It should be understood that the actual power dissipation of a given processor, single or multi-core, when operating with a fixed frequency and core voltage, will vary with load. For example, at maximum frequency and core voltage and 100% load, a given processor may dissipate 120 watts. However, this same processor, operating at the maximum frequency and core voltage and a 0% load, may dissipate only 20 watts. Since processor loading is unpredictable, this may complicate processor power management.

Power management may be further complicated in large data centers with large numbers processors. For example, a given data center may have a maximum power constraint, e.g., the maximum power that may be delivered to a given group of computers. Under traditional power management schemes, there is little correlation between a given performance state and the actual power dissipated by a processor. In order to address this problem, processor power dissipation may be limited by a power target, e.g., a maximum power dissipation. The power target may be independent of the P-State. The use of a power control scheme based on a power target allows a data center to operate within its maximum power constraint. It should be understood that a single power target or multiple power targets could be used without departing from the scope of this disclosure. The power constraint may be adjusted as needed based on a variety of environmental conditions, e.g., the cost of electricity.

Table 1 below shows several power targets that may be used to limit processor power consumption:

TABLE 1

| Power target | Description |
| --- | --- |
| ChipTdpLimit | Chip Power Target |
| SwTdpLimit | Software Power Target |
| ApmlTdpLimit | Apml Power Target |

In this example, the lowest value of the three power targets, ChipTdpLimit, SwTdpLimit or ApmlTdpLimit, is selected as the value used for a given processor power target. These limits are not tied to a discrete P-state and may operate within a range of P-states given the activity level of the applications running on the processor. The power targets may be adjusted by a variety of mechanisms. For example, initial values may be set via system BIOS.

ChipTdpLimit is typically set at manufacturing test time based upon the intended maximum power allowed for the processor. In general, ChipTdpLimit corresponds to the thermal design power of a particular ordering part number. A product is tested to fit a particular thermal design power which is dictated by the cooling solution and the voltage regulator capabilities, e.g., the amount of current it can supply. ChipTdpLimit sets an upper limit based on the physical constraints of the cooling solution. SwTdpLimit is typically controlled by the operating or host software. This power limit allows the host software to set a processor power target based on environment conditions know to the host, e.g., system/component temperatures, processor loading and the like. ApmlTdpLimit is generally controlled via a sideband interface such as an Advance Platform Management Link (APML). ApmlTdpLimit allows external agent software to set a processor power target based on environment conditions know to the external agent, e.g., data center power constraints and the like.

Figure 2:
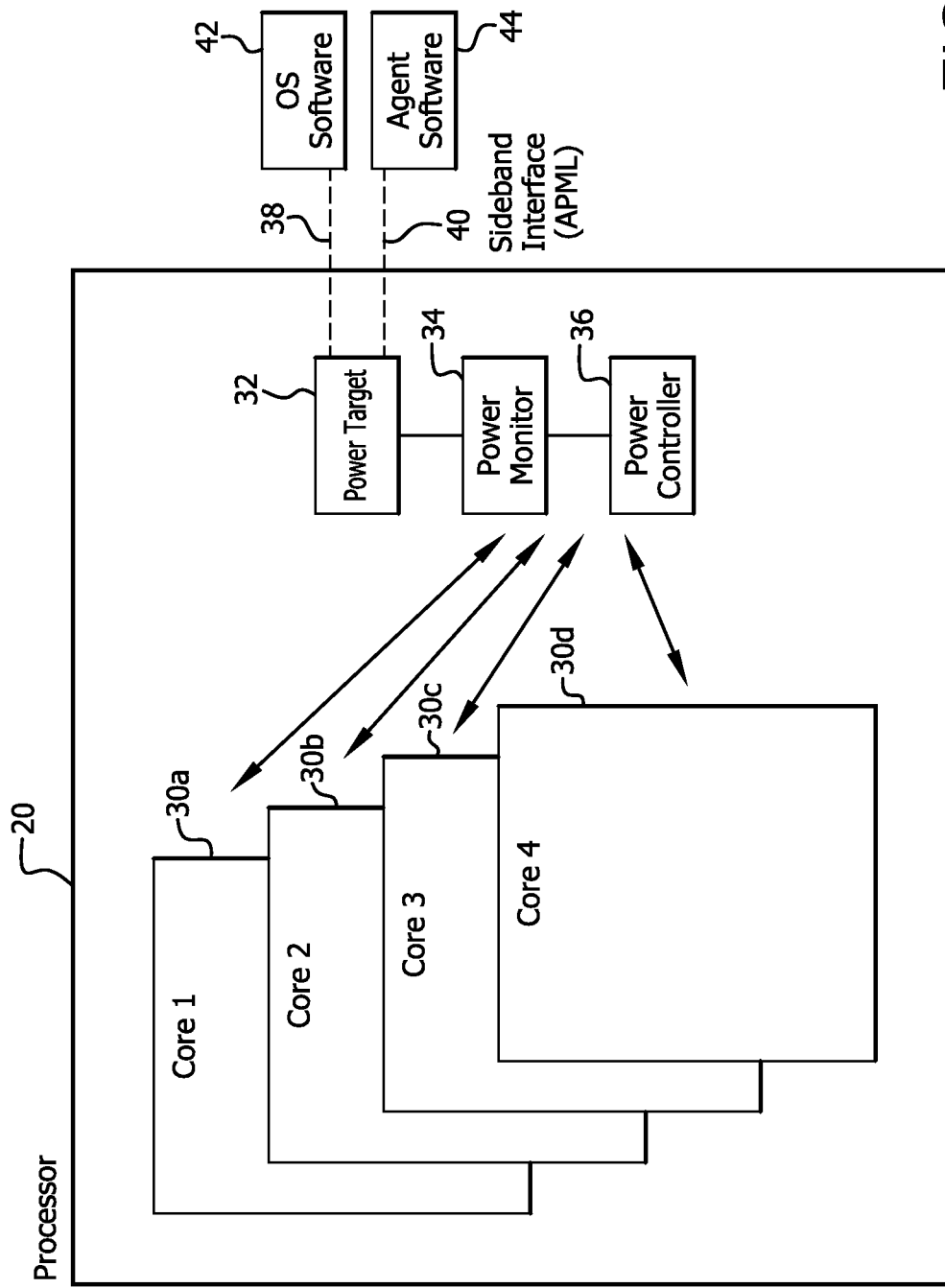
FIG. 2 is a block diagram of a multi-core processor.

FIG. 2 shows a multi-core processor 20 with processor cores 30a, 30b, 30c and 30d. The processor 20 has a power monitor 34 and power manager or controller 36. A variety of power monitors and power controllers may be used including those disclosed in US Patent Publication No. 2009/0259869 entitled "Sampling Chip Activity for Real Time Power Estimation" which is incorporated by reference herein in its entirety. The processor 20 has one or more programmable locations 32 configured to store one or more power targets. Some power targets, e.g., SwTdpLimit, may be updated via operating system software 42 via the OS interface 38. Other power targets, e.g., ApmlTdpLimit, may be updated by external agent software 44 via sideband interface 40. As noted above, the lowest value of the three power targets, ChipTdpLimit, SwTdpLimit or ApmlTdpLimit, is selected as the value used as the processor power target.

The power monitor 34 generally monitors the power dissipated by the processor 30 under the current workload. The power controller 34 generally controls one or more processor/core power parameters, e.g., the processor core voltage and/or frequency, so that the processor power dissipation does not exceed the power target. It should be understood that the power monitor may use a variety of different techniques to measure the current power dissipation. For example, the power monitor may track a variety of events that occur in the processor core in a given time window or sampling interval, e.g., the number of integer instructions executed, number of floating point instructions executed, the number of cache accesses. Based on this information, the power monitor may compute the power dissipation in the given time window.

Figure 3:
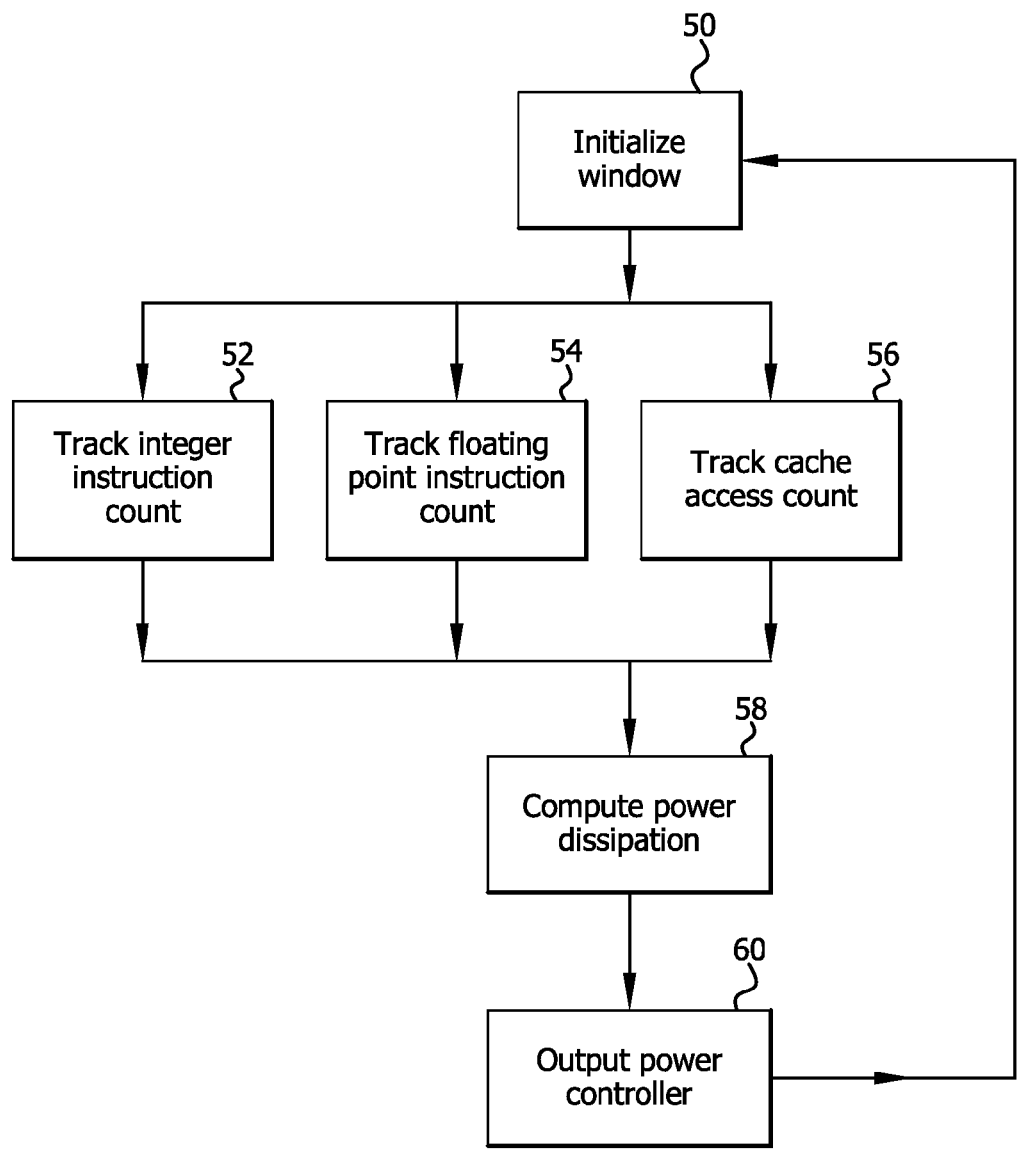
FIG. 3 is a flow chart showing general operation of the power monitor.

FIG. 3 is a flow chart showing general operation of the power monitor 34. It should be understood that any flowcharts contained herein are illustrative only and that other entry and exit points, time out functions, error checking functions and the like (not shown) would normally be implemented in a typical system. Any beginning and ending blocks are intended to indicate logical beginning and ending points for a given subsystem that may be integrated into a larger device and used as needed. The order of the blocks may also be varied without departing from the scope of this disclosure. Implementation of these aspects is readily apparent and well within the grasp of those skilled in the art based on the disclosure herein.

As discussed above, the power monitor may track a variety of events that occur in the processor in a given time window, e.g., a predetermined number of clock cycles. The circuitry is initialized, e.g., all counts are set to zero, as shown by block 50. In this example, the power monitor tracks the number of integer instructions executed (block 52), number of floating point instructions executed (54) and the number of cache accesses (56). Each of these operations is generally associated with a power consumption estimation. Upon completion of the window, the power monitor calculates an estimated total power consumption or dissipation (measured power) as shown by block 58. This value is output to the power controller as shown by block 60. This process is repeated on a periodic or intermittent basis. It should be understood that a variety of power monitoring techniques may be used without departing from the scope of the invention. For example, power consumption may be estimated by measuring the node capacitance, e.g., switched capacitance and effective capacitance from crossover current. Use of such other power estimation techniques are within the scope of this disclosure.

Figure 4:
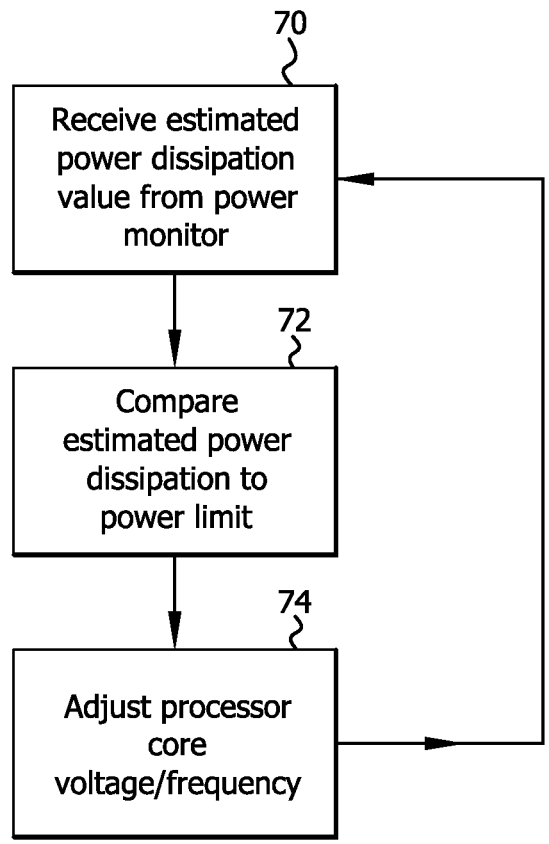
FIG. 4 is a flow chart showing general operation of the power controller.

FIG. 4 is a flow chart showing general operation of the power controller 36. The power dissipation is received from the power monitor as shown by block 70. The power dissipation is compared to the power target as shown by block 72. The processor 30 core voltage and/or frequency is adjusted, up or down, for maximum performance and so that the processor power remains below the power target. It is understood that individual processor cores may be adjusted such that the total processor power dissipation remains below the power target.

Figure 5:
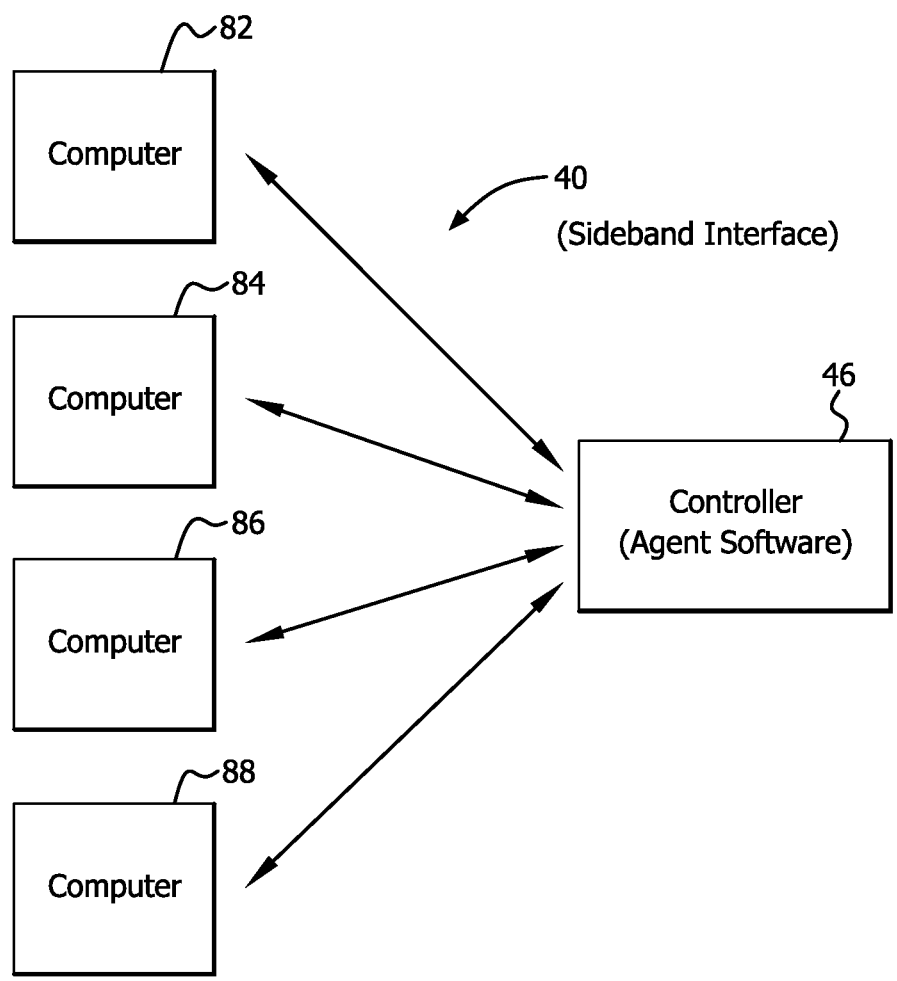
FIG. 5 is a block diagram of a data center configuration.

FIG. 5 is a block diagram of a data center configuration. One or more controllers 46 is coupled to a plurality of computers (82-88) via sideband interface 40. Controller 46 includes agent software configured to manage data center power usage. One or more processors residing in computers 82-88 may be configured with a power target such ApmlTdpLimit. Processor power dissipation may be limited by the power target, ApmlTdpLimit, as opposed to P-State management. The use of a power control scheme based on a power target allows a data center to operate at the highest possible performance within its power constraint. The data center power constraint may be adjusted as needed based on a variety of environmental conditions (e.g., the cost of electricity). The Agent may also change power targets for processors residing in computers 82-88 based on various loading conditions.

It should be understood that many variations are possible based on the disclosure herein. Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

What is claimed is:

1. A processor comprising:
a first programmable location configured to store a processor power target;
a power monitor configured to estimate a power dissipation due to processor load;
a power controller configured to adjust a processor power parameter based on the power target and the power dissipation;
comprising an interface for an operating system, wherein a second programmable location is configured to store a software processor power target accessible by the operating system; and
a sideband interface for an external agent, wherein a third programmable location is configured to store an agent processor power target accessible by the external agent;
wherein the processor power target is set to the lowest value stored in the first and second programmable locations.

2. The processor of claim 1 wherein the processor power target is set to the lowest value stored in the first, second and third programmable locations.

3. The processor of claim 1 wherein the monitor is configured to estimate a power dissipation from loading associated with multiple cores of the processor.

4. The processor of claim 1 wherein the power controller is configured to adjust a processor power parameter associated with multiple cores of the processor.

5. The processor of claim 1 wherein the power controller is configured to adjust a processor core voltage such that the power dissipation stays below the power target.

6. The processor of claim 1 wherein the power controller is configured to adjust a processor core frequency such that the power dissipation stays below the power target.

7. The processor of claim 1 wherein the power monitor is configured to estimate the power dissipation during a time window by tracking processor instructions, each processor instruction having a power consumption estimation and calculating the power dissipation from the power consumption estimates from the power instructions tracked during the time window.

8. A method of limiting power dissipation in a processor, the method comprising:
storing a processor power target in a first programmable location;
estimating a power dissipation due to processor load;
adjusting a processor power parameter based on the power target and the power dissipation;
providing an interface for an operating system, wherein a second programmable location is configured to store a software processor power target accessible by the operating system; and
providing a sideband interface for an external agent, wherein a third programmable location is configured to store an agent processor power target accessible by the external agent;
wherein the processor power target is set to the lowest value stored in the first and second programmable locations.

9. The method of claim 8 wherein the processor power target is set to the lowest value stored in the first, second and third programmable locations.

10. The method of claim 8 further comprising estimating a power dissipation from loading associated with multiple cores of the processor.

11. The method of claim 8 further comprising adjusting a processor power parameter associated with multiple cores of the processor.

12. The method of claim 8 further comprising adjusting a processor core voltage such that the power dissipation stays below the power target.

13. The method of claim 8 further comprising adjusting a processor core frequency such that the power dissipation stays below the power target.

14. The method of claim 8 further comprising estimating the power dissipation during a time window.

15. A non-transitory computer readable media including hardware design code stored thereon, and when processed generates other intermediary data to create mask works for a processor that is configured to perform a method of limiting power dissipation in a processor, the method comprising:
storing a processor power target in a first programmable location;
estimating a power dissipation due to processor load;
adjusting a processor power parameter based on the power target and the power dissipation;
providing an interface for an operating system, wherein a second programmable location is configured to store a software processor power target accessible by the operating system; and
providing a sideband interface for an external agent, wherein a third programmable location is configured to store an agent processor power target accessible by the external agent;
wherein the processor power target is set to the lowest value stored in (1) the first and second programmable locations or (2) the first, second and third programmable locations.

* * * * *